(12) United States Patent
Shapiro (10) Patent No.: US 7,658,252 B2
(45) Date of Patent: Feb. 9, 2010

(54) RIDING VEHICLES, INCLUDING TRICYCLES, WITH STOWABLE PUSH HANDLES AND HIDE AWAY REAR WHEEL STORAGE COMPARTMENT

(76) Inventor: Richard N. Shapiro, 1668 Dry Cove Dr., Virginia Beach, VA (US) 23454

( * ) Notice: Subject to any disclaimer, the term of this patent is extended or adjusted under 35 U.S.C. 154(b) by 407 days.

(21) Appl. No.: 11/824,722

(22) Filed: Jul. 3, 2007

(65) Prior Publication Data

US 2009/0008164 A1    Jan. 8, 2009

(51) Int. Cl.
*B62K 15/00* (2006.01)
(52) U.S. Cl. .................. 180/208; 180/210; 180/19.3; 280/62; 280/278; 280/287; 280/304.4
(58) Field of Classification Search .............. 180/210, 180/208, 21, 209, 19.3; 280/288.4, 288.3, 280/292, 293, 298, 304.5, 287, 278, 282, 280/62; 296/181.7
See application file for complete search history.

(56) References Cited

U.S. PATENT DOCUMENTS

| 3,314,494 | A | * | 4/1967 | Weitzner | .................. 180/208 |
|---|---|---|---|---|---|
| 3,755,835 | A | * | 9/1973 | Boersig | .................. 114/344 |
| 6,666,470 | B2 | * | 12/2003 | Li | .................. 280/282 |
| 7,222,871 | B2 | * | 5/2007 | Michelau et al. | ............ 280/293 |
| 2003/0132596 | A1 | * | 7/2003 | Li | .................. 280/263 |
| 2004/0239070 | A1 | * | 12/2004 | Chao | .................. 280/278 |
| 2004/0245743 | A1 | * | 12/2004 | Chao | .................. 280/278 |
| 2006/0237947 | A1 | * | 10/2006 | Michelau et al. | ............ 280/293 |
| 2008/0001374 | A1 | * | 1/2008 | Liao | .................. 280/62 |

* cited by examiner

*Primary Examiner*—Paul N Dickson
*Assistant Examiner*—Drew Brown (57) ABSTRACT

Wheeled riding vehicles, including tricycles, with extremely thin stowed profiles are provided, which in one embodiment, include movable, collapsible tires/wheel axle assemblies, as well as folding frame parts and a unique handle that is removable and stowable within the vehicle frame when not used. The riding vehicle hangs totally flat on the wall, or fits in car trunks easily. One version is pedal powered, and a second embodiment provides for an integrated propulsion linkage providing for battery or motor power to the rear most wheels when they are moved into their operative position. The rear tire wheel assemblies also may be stowed and folded compactly inside a rear storage compartment with a lid.

15 Claims, 11 Drawing Sheets

RIDING VEHICLES, INCLUDING TRICYCLES, WITH STOWABLE PUSH HANDLES AND HIDE AWAY REAR WHEEL STORAGE COMPARTMENT

RELATIONSHIP TO OTHER APPLICATIONS

Previous U.S. Pat. No. 7,100,929, a divisional patent of U.S. Pat. No. 6,607,207 in which inventor Shapiro is a co-inventor.

FIELD OF THE INVENTION

The present invention relates to wheeled riding devices, pedal or motive powered cycles and "go-carts", tricycles, recumbent cycles, and more particularly to unique fold flat attributes, and provides improvements to push handles, and storage of the handles, improvements relating to versatile, stowable wheels, which uniquely store inside a multiple use rear storage compartment. Besides Shapiro, et al U.S. Pat. No. 7,100,929 discussed below, many foldable tricycles are described by Lim in U.S. patent application Ser. No. 10/658,620, however, this disclosure and the prior art is lacking the versatile rear storage compartment disclosed herein, which provides for selectively housing the stowed rear pivoting wheel assemblies covered in this application. Also, prior art relating to riding vehicle/tricycle push handles are described by Michelau in U.S. patent application Ser. No. 10/113,588, however, the prior art including Michelau's disclosures do not provide for the removable and stowable handles disclosed by the applicant herein.

BACKGROUND OF THE INVENTION

Consumers are increasingly interested in compact, space-saving products, including space-saving wheeled vehicles such as the invention herein. Inventor Shapiro has been granted previous U.S. patents on a wide variety of "fold flat" wheeled products, most particularly relevant are a previous patent relating to tricycles and ride on vehicles, U.S. Pat. No. 7,100,929, a divisional patent of U.S. Pat. No. 6,607,207. This invention further refines fold-flat concepts on wheeled riding vehicles including tricycles, and discloses removable and stowable handles, and methods to fold the wheel assemblies into a storage compartment, among other disclosures relating to uniques methods to provide motive power and propulsion to the pivoting/stowable wheel assemblies.

The inventions here provide for standard or fold-flat and collapsible three or four wheeled devices, including children's tricycles as well as adult vehicles, and further applies pedal-power or motor/battery power to these wheeled vehicles. The wheeled vehicles may be standard non-folding vehicles adapting the removable and stowable handles, or may in certain circumstances include fold-flat vehicles as well.

One object of the invention is to provide for unique push or pull handles for wheeled vehicles, mainly to provide for selectively removable push handles that may be placed in an operative position to allow an adult to push/pull a children's embodiment of the tricycle vehicle, but allows the selective removal of the handle and the stowing of the handle within the hollow or shaped receiving portion of the central frame of the wheeled vehicle.

In an alternate embodiment, it is another object of the invention to provide that the same push handle may instead alternatively be stowed transversely along what is called the rear frame and rear compartment of the wheeled vehicle.

Another object of the invention is to provide for several alternative types of grasps for the handle, and to provide that the handles may be extensible and retractable using common methods applied in other areas of art.

Another object of the invention is to provide for unique storage compartments for wheeled vehicles, and to provide that the storage compartments may allow for storage of objects while the vehicle is in an operative position, but once the entire vehicle is to be stowed, the same compartment may also be occupied by one or more of the folding wheel axle assemblies of the device.

It is a further object of the invention to provide that a battery/fuel cell or motor may be mounted in the interior or exterior of the rear frame compartment and that the battery or motive power may be applied to one or more of the wheels mounted to the rear frame.

DESCRIPTION OF THE PREFERRED EMBODIMENTS

First, all of the components of the disclosures are listed below:

| | |
|---|---|
| 1-A | Riding Vehicle (pedal power) |
| 1-B | Alternate riding vehicle (alternative motive power sources) |
| 1 | Central Frame |
| 2 | Rear Wheel Frame Compartment |
| 2-A | Moveable and Pivotable Wheel Axle Assembly |
| 2-B | Tire axle |
| 3 | Rear Compartment Lid |
| 4 | Rear Compartment Storage Container |

-continued

First, all of the components of the disclosures are listed below:

| | |
|---|---|
| 5 | Rear Tire |
| 6 | Rear Frame Connector |
| 7 | Central Frame Rear Frame Receptor |
| 8 | Moveable Seat |
| 9 | Seat Receiving Slot (for Handle) |
| 10 | Moveable Seat Connector Rear Post |
| 10-A | Moveable Seat Post |
| 10-B | Seat Connector Post Receiving Slot |
| 11 | Forward Frame System |
| 12 | Forward Frame Connector |
| 12-A | Connector Multiple Connector Positions |
| 13 | Hollow Cavity Central Frame |
| 14 | Latching Means |
| 15 | Handle |
| 15-A | Outer Stage Handle |
| 15-B | Inner Stage Handle |
| 16 | Positional Handle Grasp |
| 16-A | Alternate Grip 1 |
| 16-B | Alternate Grip 2 |
| 17 | Selectively Releaseable Latching Pin |
| 18 | Alternate Handle Receiving Slot |
| 19 | Forward Frame Alternate Receiving Slot |
| 20 | Pedal |
| 21 | Forward Tire |
| 22 | Handle Grip storage Position |
| 23 | First Alternate Grip Storage Position |
| 24 | Second Alternate Grip Storage Position |
| 25 | Handle bar posts |
| 26 | Forward frame handlebar frame |
| 27 | Sprocket |
| 28 | Belt or Chain |
| 29 | Wheel Assembly Female gear |
| 29-B | Drive Linkage Male Tip gear |
| 30 | direct wheel propulsion male linkage |
| 31 | pivot |
| 32 | fixing member |
| 33 | propulsion linkage male retaining tip |
| 34 | Motive power sprocket |
| 35 | Indirect power belt or chain |
| 36 | Motor/battery/power cell and shaft |
| X | Motor or Power source |

Figure 1:
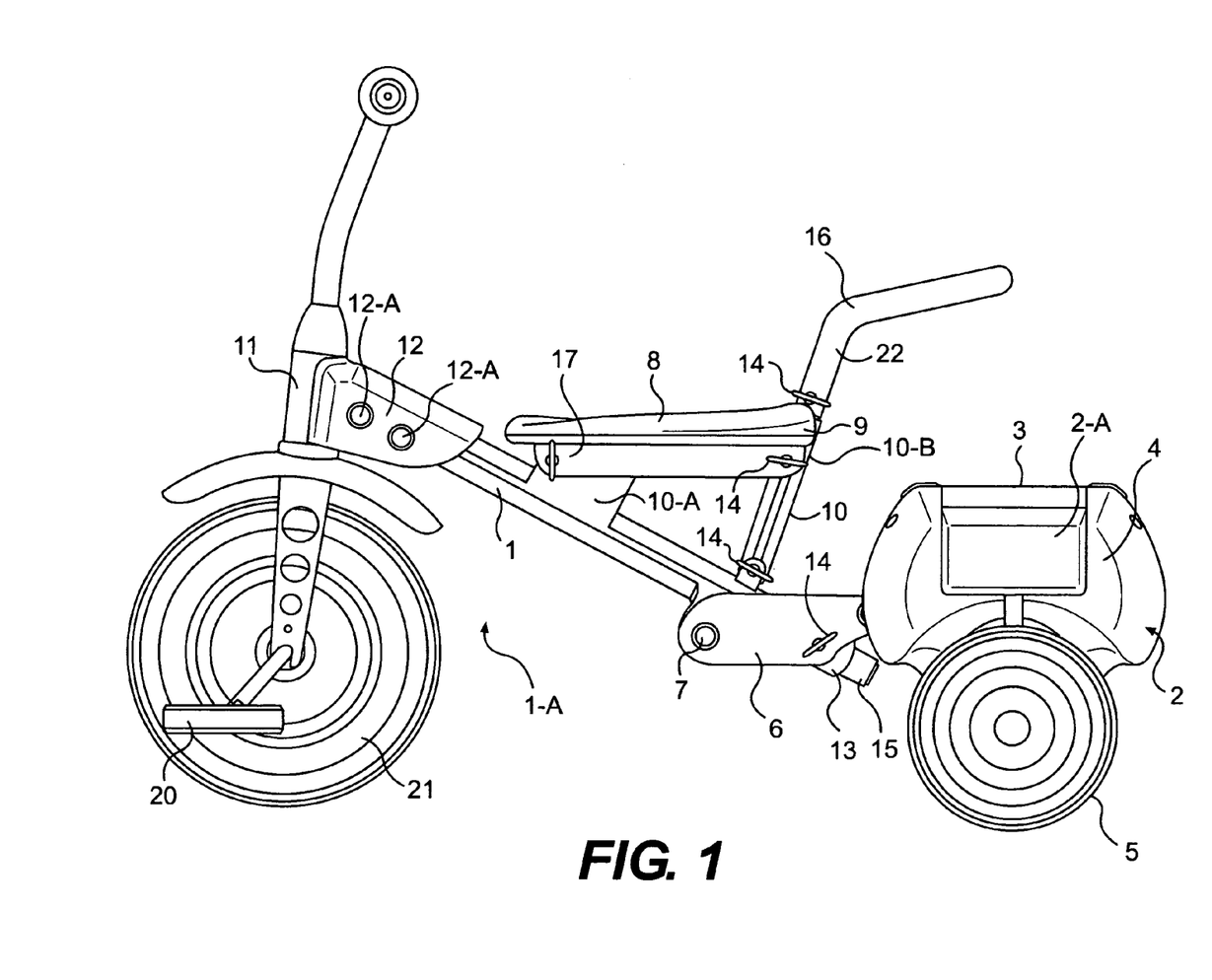
FIG. 1 is a side elevational view of the preferred embodiment of a wheeled vehicle, 1-A, and this embodiment depicts a three-wheeled tricycle. The vehicle is in a fully operative position.

Referring to FIG. 1 is showing a wheeled riding vehicle, 1-A. The wheeled vehicle in the preferred embodiment shows one forward wheel, 21 and a pair of rear wheels, 5. It is appreciated that the vehicle may instead have four wheels and may orient the wheels in a different configuration. The preferred vehicle, 1-A, has a forward frame system, 11, which is joined to a central frame, 1, by a forward frame connector, 12, which also may have multiple positions, 12-A, which allow moveable orientation of the central frame, 1, in relation to the forward frame, 11. The forward frame, 11, also has a pair of pedals, 20, allowing a person to propel the vehicle in this embodiment. It is appreciated that if a motor/battery powered vehicle is adopted (described later as vehicle 1-B) that instead of the pedals, 20, a rigid post may be mounted to either side of the forward frame to allow the user to rest their legs on the posts (not shown) or suitable extensions may be added to the central vehicle frame to serve as leg rests.

Referring to FIG. 1, a seat, 8, is mounted to the central frame, 1, by means of a moveable seat connector rear post, 10, as well as a moveable forward seat post, 10-A, (although the moveable forward post is not shown as moveable in this embodiment, it may be so moveable). The seat, 8, is mounted to the central frame, 1, by a moveable seat connector rear post, 10, connected with latching means, 14. The seat, 8, in this preferred embodiment, has a seat receiving slot in the rear of the seat that receives a push handle, 15, (not shown in FIG. 1) and also may include near the terminal end, a positional handle grasp, 16, as FIG. 1 shows the handle grip storage position, 22, in which the main length of the shaft is stowed, as described further elsewhere.

The positional handle grasp, 16, may travel through the seat receiving slot, 9, inside a slot in the moveable seat connector rear post, 10, by virtue of a slot, 10-B, inside the moveable seat connector rear post, 10.

Also, referring exclusively to FIG. 1, it is shown that there is a rear wheel frame compartment, 2, which is connected to the central frame by the rear frame connector, 6, which connects to the central frame or rear frame receptor, 7. Mounted to the rear wheel frame 2 and rear frame compartment 4 are two rear tires 5 (including their wheel assemblies). The rear wheel frame, 2, serves as a mount for the moveable wheel axle assembly, 2-A (one shown here). While the preferred embodiment may be a standard vehicle without foldable aspects, this preferred embodiment shows moveable wheel axle assemblies, 2-A, in their operative position. In a view shown elsewhere, the two moveable wheel axle assemblies, 2-A, may be completely stored inside the rear wheel frame, 2, within a rear storage container, 4. Prior to stowing said rear tires, 5, the user would lift a rear compartment lid, 3, in order to orient the tires into their stowed position.

Figure 2:
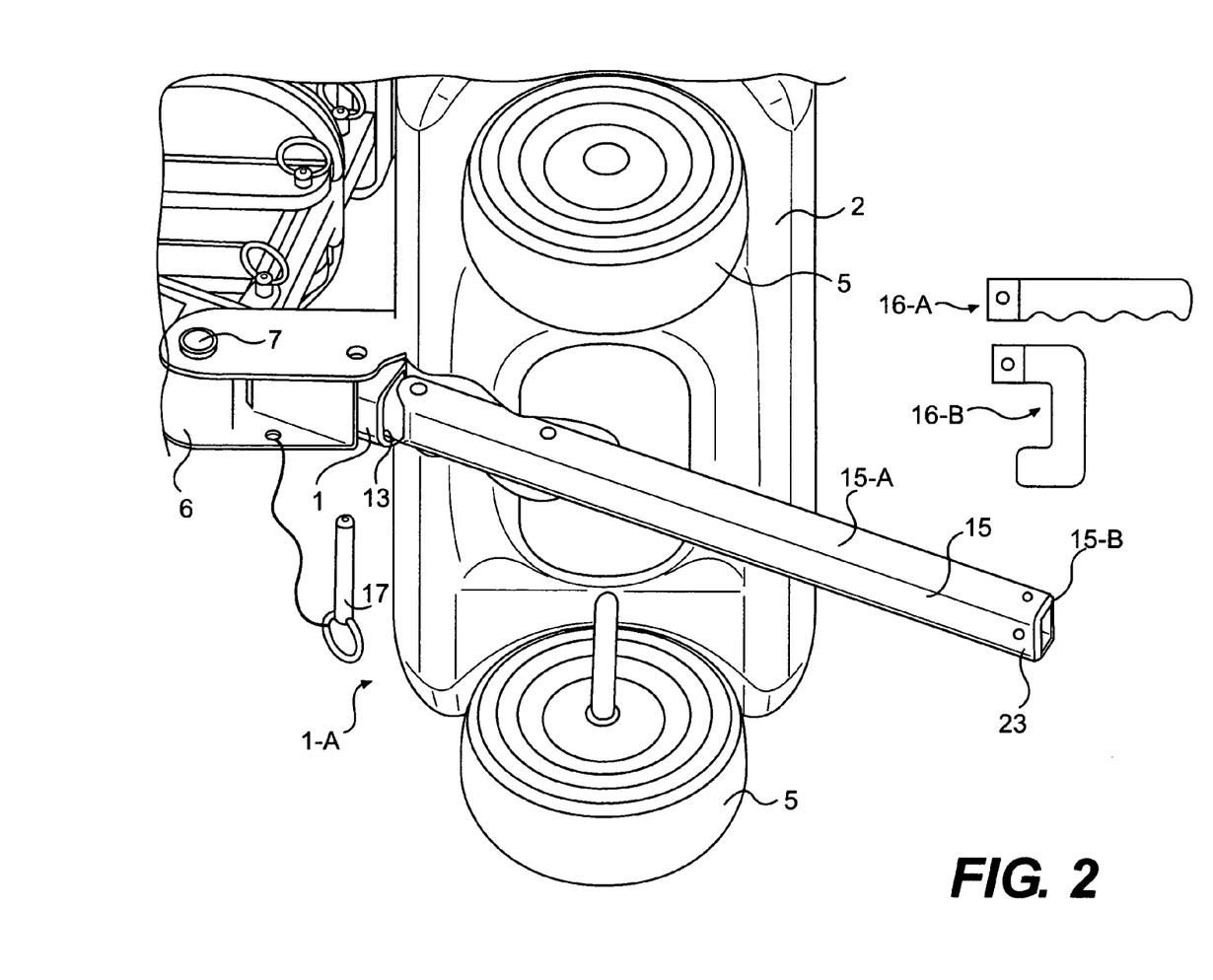
FIG. 2 is an underside perspective of the wheeled vehicle, 1-A, in an operative position, focusing on the stowing of the handle.

Now referring to FIGS. 2-6, the figures depict one preferred method for storage of a push handle, 15. FIG. 2 shows a push handle, 15, which in this particular embodiment has two stages allowing it to extend and retract (more stages may be employed). The outer stage, 15-A, houses the inner stage, 15-B, and the entire handle may be stowed inside a hollow matching cavity or slot, 13, formed from the central frame, 1 (rather than a hollow frame as shown, any suitable shaped portion of the central frame may be adapted to retain the stored handle). Once the handle is slid into the hollow cavity in the central frame, 1, it may be retained in this storage position by virtue of any suitable latch or the selectively removable means, 17, shown as one option in FIG. 2. It is understood that any type of latch may be applied whether removable or forming a detente or any other means to retain the handle in the storage position within the central frame, 1.

Figure 3:
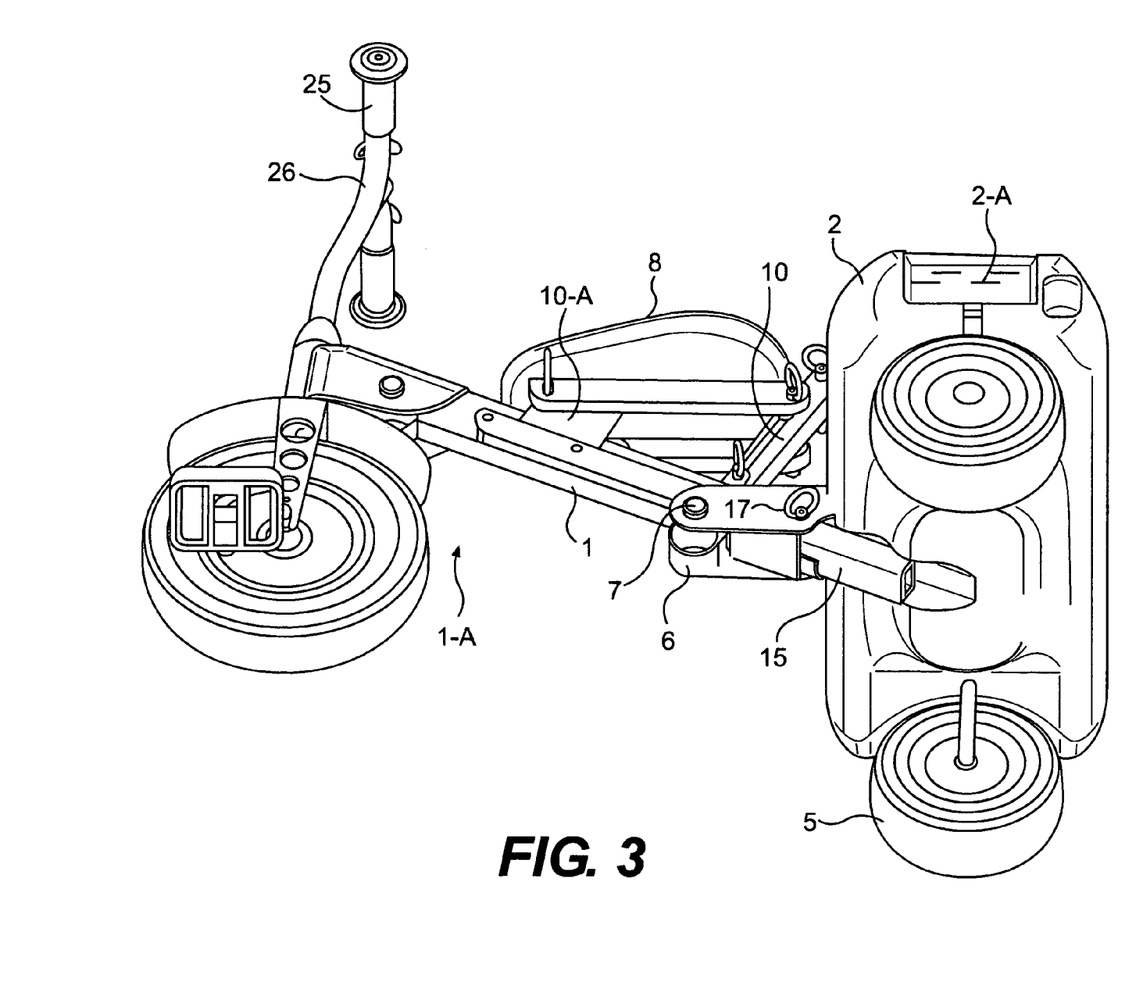
FIG. 3 is an underside perspective of the fully operative wheeled vehicle, 1-A, showing the vehicle in a fully operative position with the handle in a fully stowed position inside the central frame.

Optional handle grasps 16-A and 16-B are shown in FIG. 2, and the entire handle 15 may be retained in the frame cavity or shaped area as seen in FIG. 3, along with the grasps 16-A or 16-B.

Figure 4:
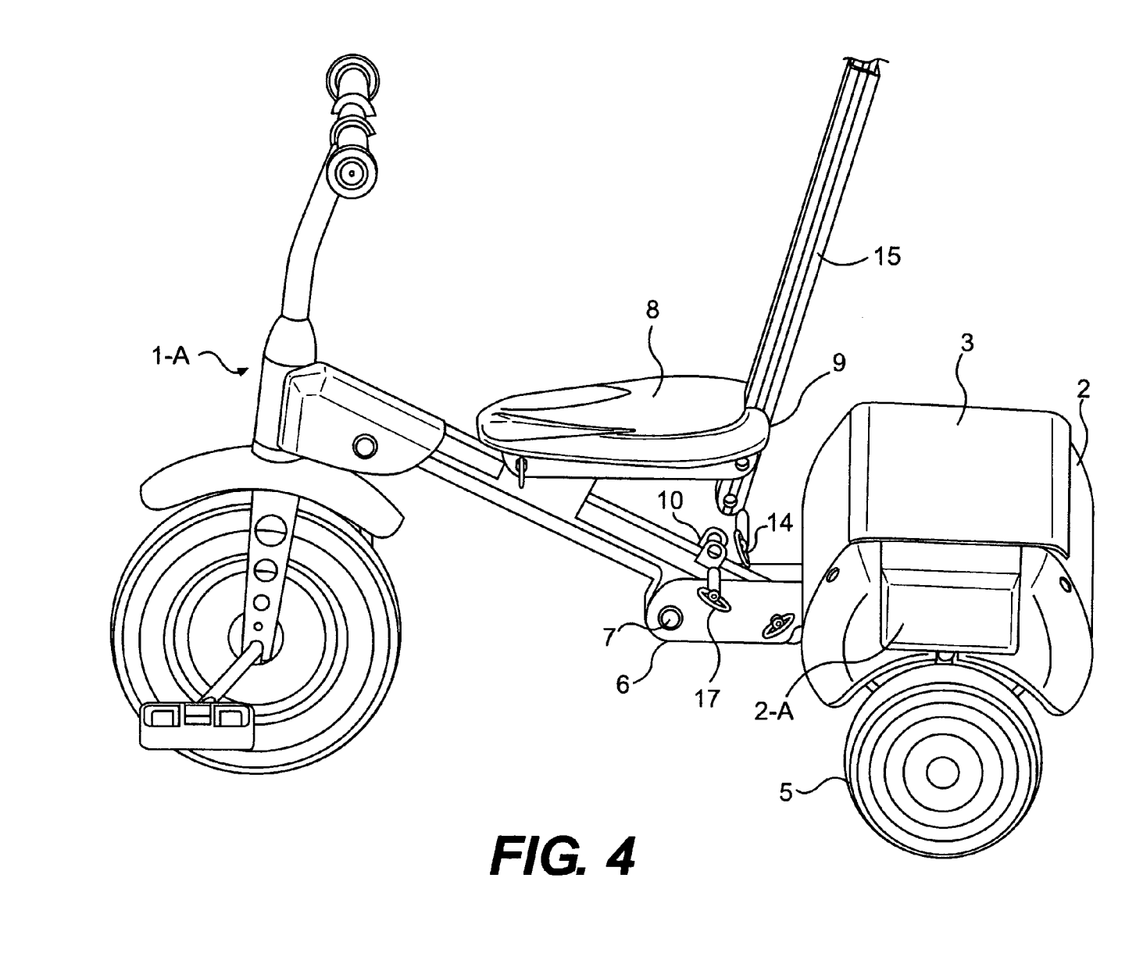
FIG. 4 is a side elevational profile of the wheeled vehicle, 1-A, in a fully operative position, focusing on the connection of the handle to the central frame of the vehicle.
Figure 5:
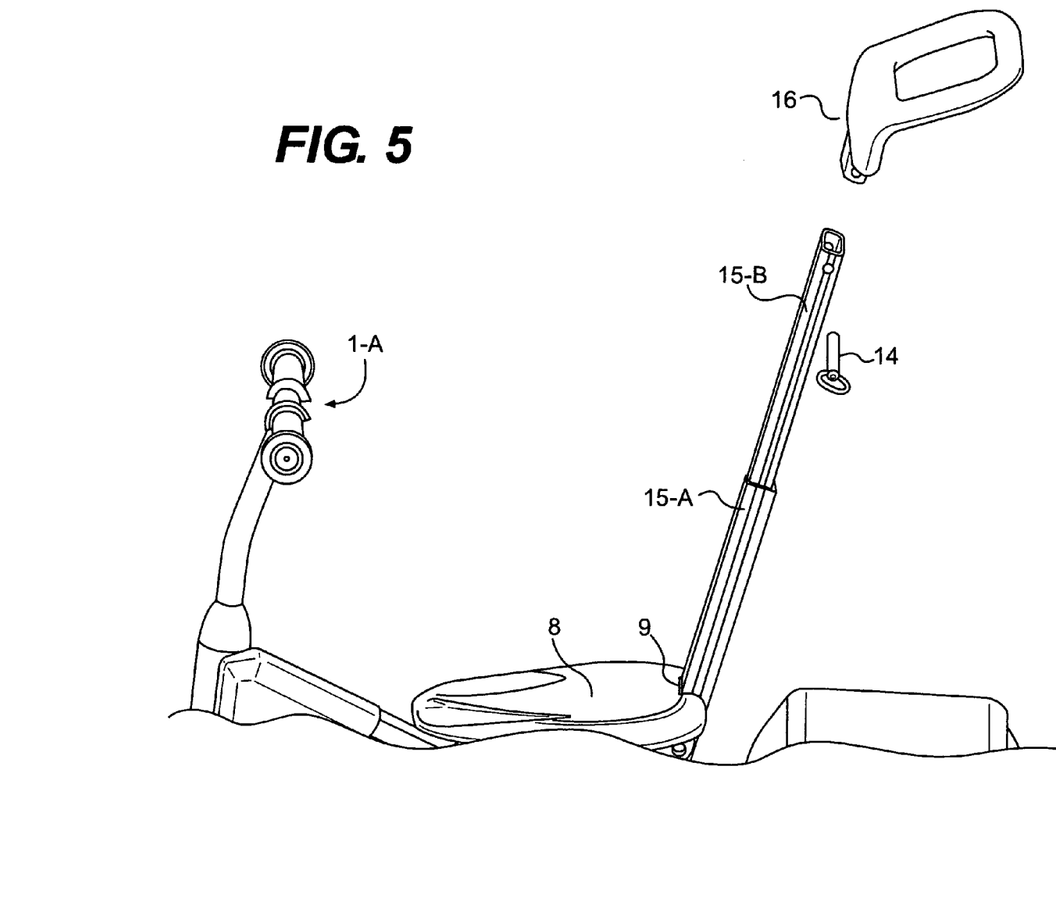
FIG. 5 is a side elevational perspective of a portion of the wheeled vehicle, 1-A, focusing on the connection of one grip to the extended handle.
Figure 6:
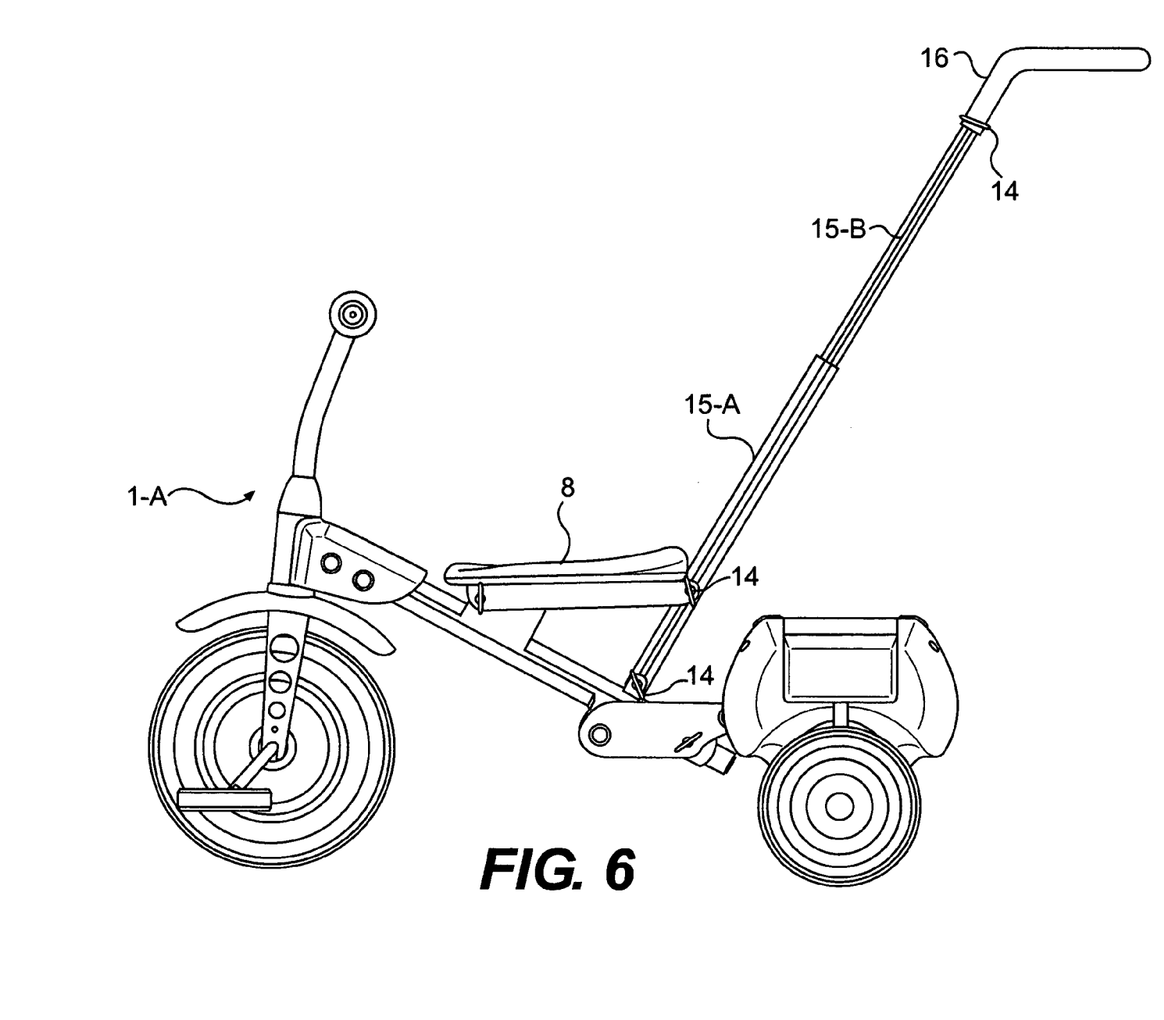
FIG. 6 is a side elevational view of the wheeled vehicle, 1-A, in a fully operative position, focusing on the fully extended handle showing the operative position of same.

FIG. 4-6 show the handle 15 detailing the connection methods and the extension/retraction of the handle parts. It is of note that the grasp 16 may be alternatively placed into the handle grasp storage position (see FIG. 1) inside the seat connection post receiving slot, 10-B, when the handle shaft, 15 is stowed elsewhere as shown in FIG. 3.

Figure 7:
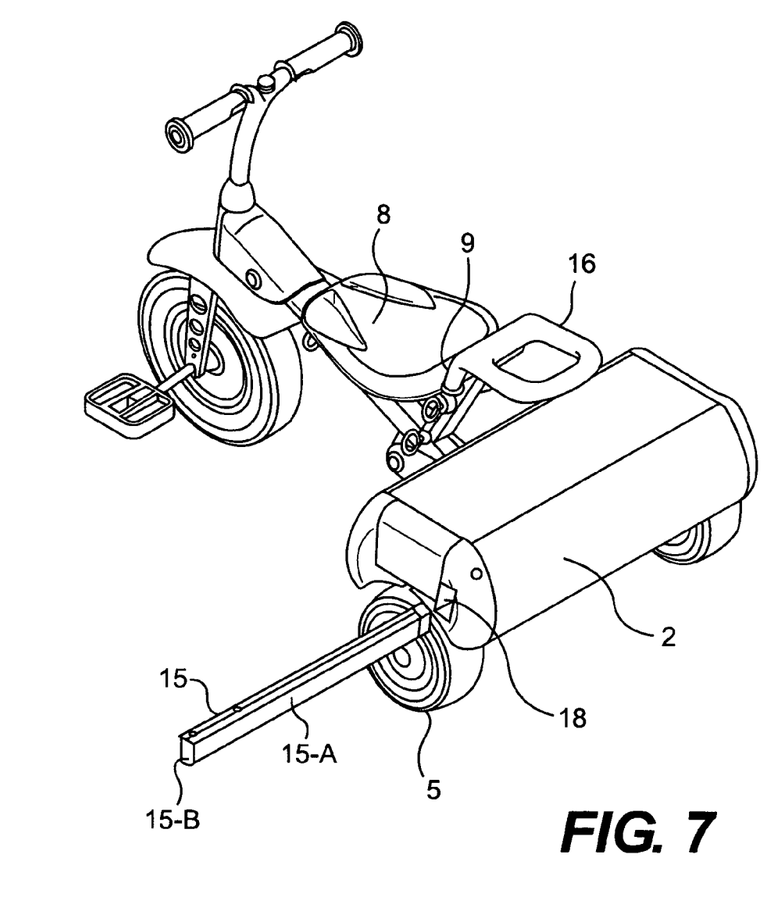
FIG. 7 is a slightly elevated, largely rear perspective of the fully operative wheeled vehicle, 1-A, depicting an alternate stowed location for the handle transversely along the rear frame compartment.

FIG. 7 shows that the handle 15 may be alternatively stored transversely along the rear wheel frame 2 along a matching cavity, slot, or suitable shaping 18, of any part of the rear frame 2.

Figure 8:
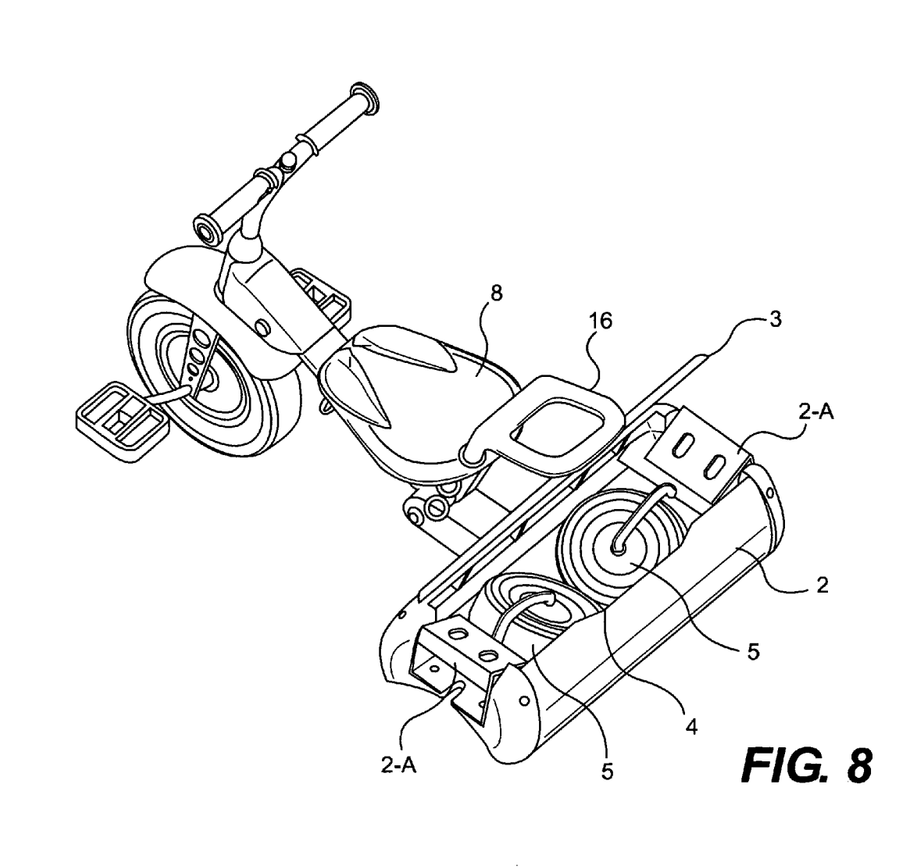
FIG. 8 is a slightly elevated, mostly rear perspective of the wheeled vehicle, 1-A, focusing on the folding wheel axle assemblies, showing them in their fully stowed position within the rear frame storage compartment with the lid raised.

FIG. 8 shows the wheeled vehicle, 1-A, with the rear wheels, 5, stowed within the rear wheel frame 2's storage compartment, 4. Each of the rear wheels are moveable to the stowed position by virtue of the moveable wheel axle assemblies, 2-A. Not shown is that a pivot system travels inside the moveable wheel axle assembly, 2-A, mounting it to the surrounding rear wheel frame side or stub walls. Also not detailed here is an internal latch system inside the moveable wheel axle assemblies, 2-A, which permit the user to move the wheel axle assemblies, 2-A, from the operative to the stowed position shown as in FIG. 8. The wheeled vehicle, 1-A, is not shown in any stowed position with the exception of the rear frame tires in FIG. 8, and FIG. 9 shows the fully stowed view of this embodiment of the wheel vehicle, 1-A.

Figure 9:
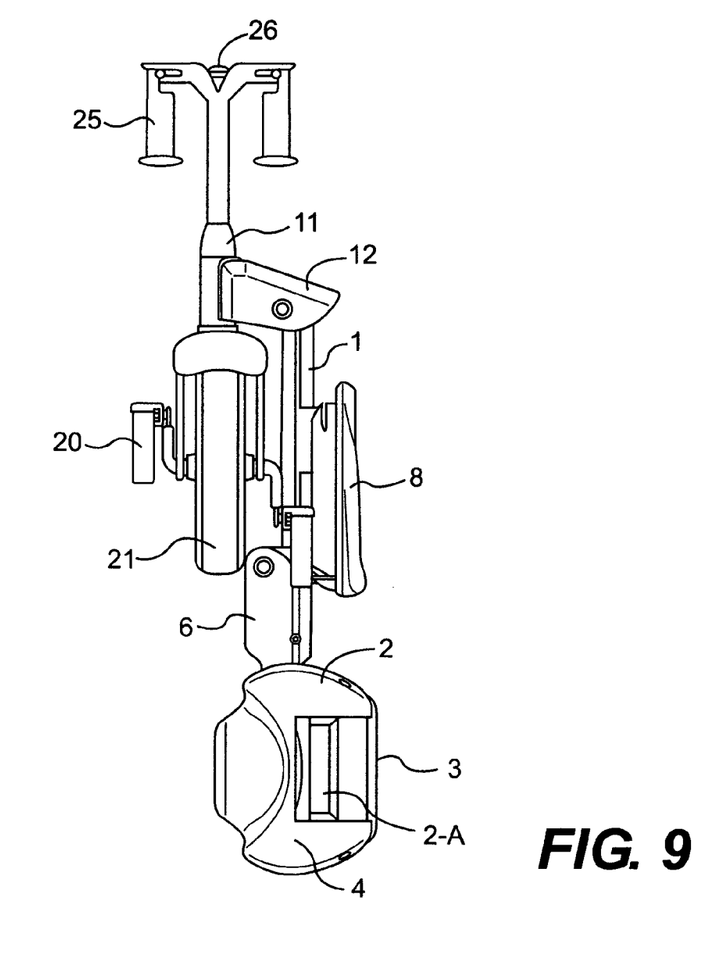
FIG. 9 is a side elevational view of the wheeled vehicle, 1-A, which is in a fully stowed status, in a vertical orientation.

Referring to FIG. 9, moving vertically from top to bottom, are shown a pair of foldable handlebar posts, 25, that mount on the upper portion of the forward frame handlebar frame, 26. While the forward wheeled frame system, 11, is oriented at between a 45 and 90° angle in its operative position, here it is shown in a stowed position permitting the vehicle to attain the thinnest side elevational profile possible, with the two pedals, 20, also foldable on a post system. The forward frame, 11, is connected to the central frame, 1, by virtue of a forward frame connector, 12, and as mentioned in other figures, there may be multiple connecting points to allow for adjustment of the seat in relation to the pedals or as alternatively stated, posts that may mount on the forward wheel system. The seat, 8, is shown in its fully stowed position and the central frame, 1, is connected to the rear wheel frame and compartment, 2, by virtue of the rear frame connector, 6, which allows the rear frame, 2, to be moveable in relation to the central frame, 1. Last, the rear frame 2 and rear compartment 4, is shown in its fully stowed status and by virtue of the moveable wheel axle assemblies, 2-A, the rear tires 5 are fully stowed inside the rear compartment storage container, 4 (they are not visible in this view). The lid, 3, covers the tires in their stowed positions. The orientation of the central frame, 1, and rear frame, 2, are in a thin side elevational profile generally parallel with the forward frame system, 11. In this particular vertical status, the vehicle may be hung vertically on any wall, and also the vehicle may be placed horizontally into a car trunk or other storage compartment, occupying a very thin side elevational profile.

Figure 10:
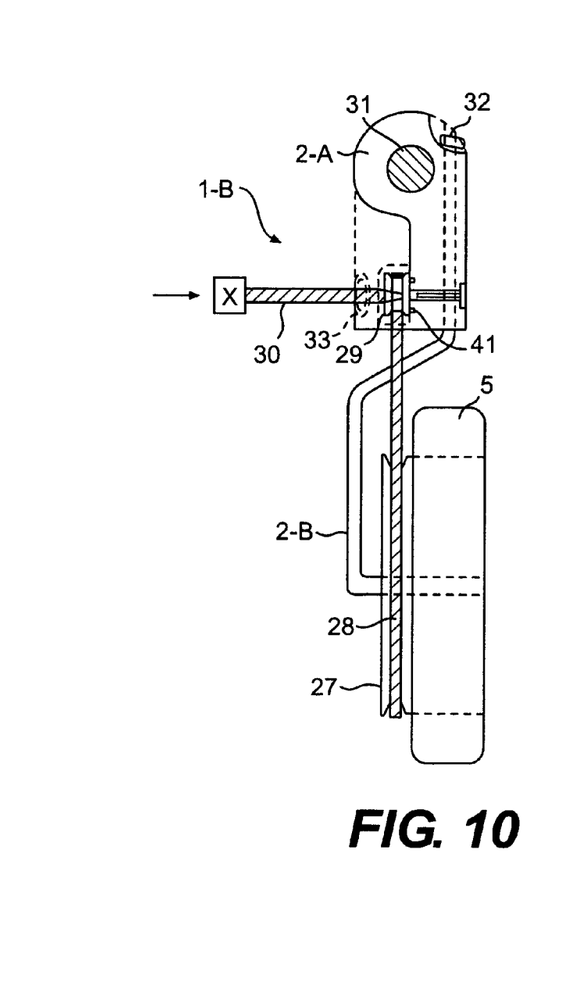
FIG. 10 is a longitudinal cross-section view of one embodiment of the motive power drive shaft linkage of vehicle 1-B.
Figure 11:
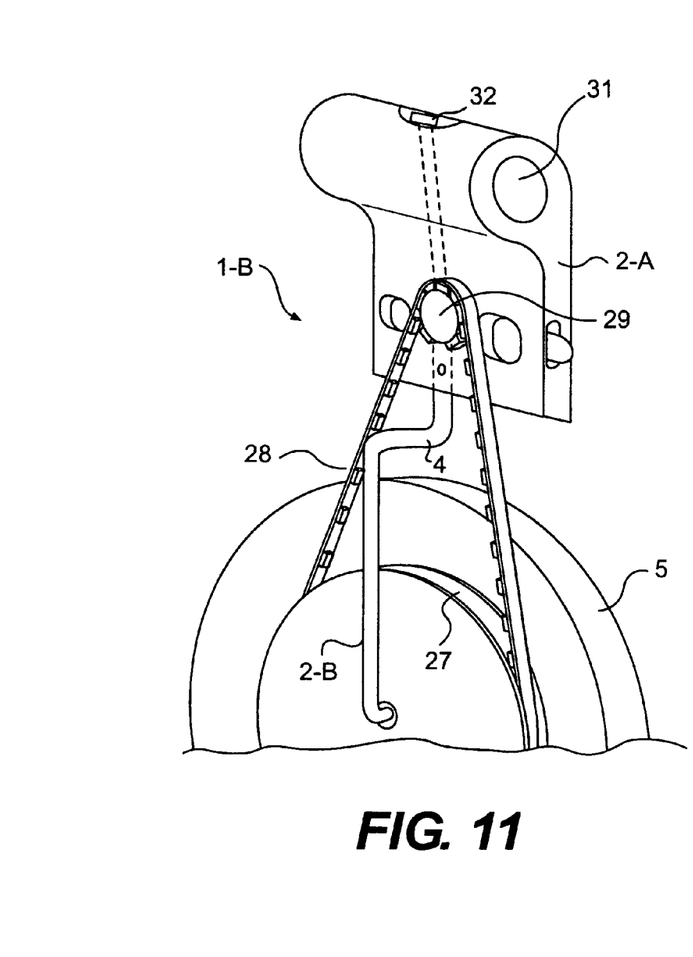
FIG. 11 is a detached perspective view of a wheel and pivoting wheel assembly highlighting a drive/linkage wheel propulsion embodiment of vehicle 1-B.
Figure 12:
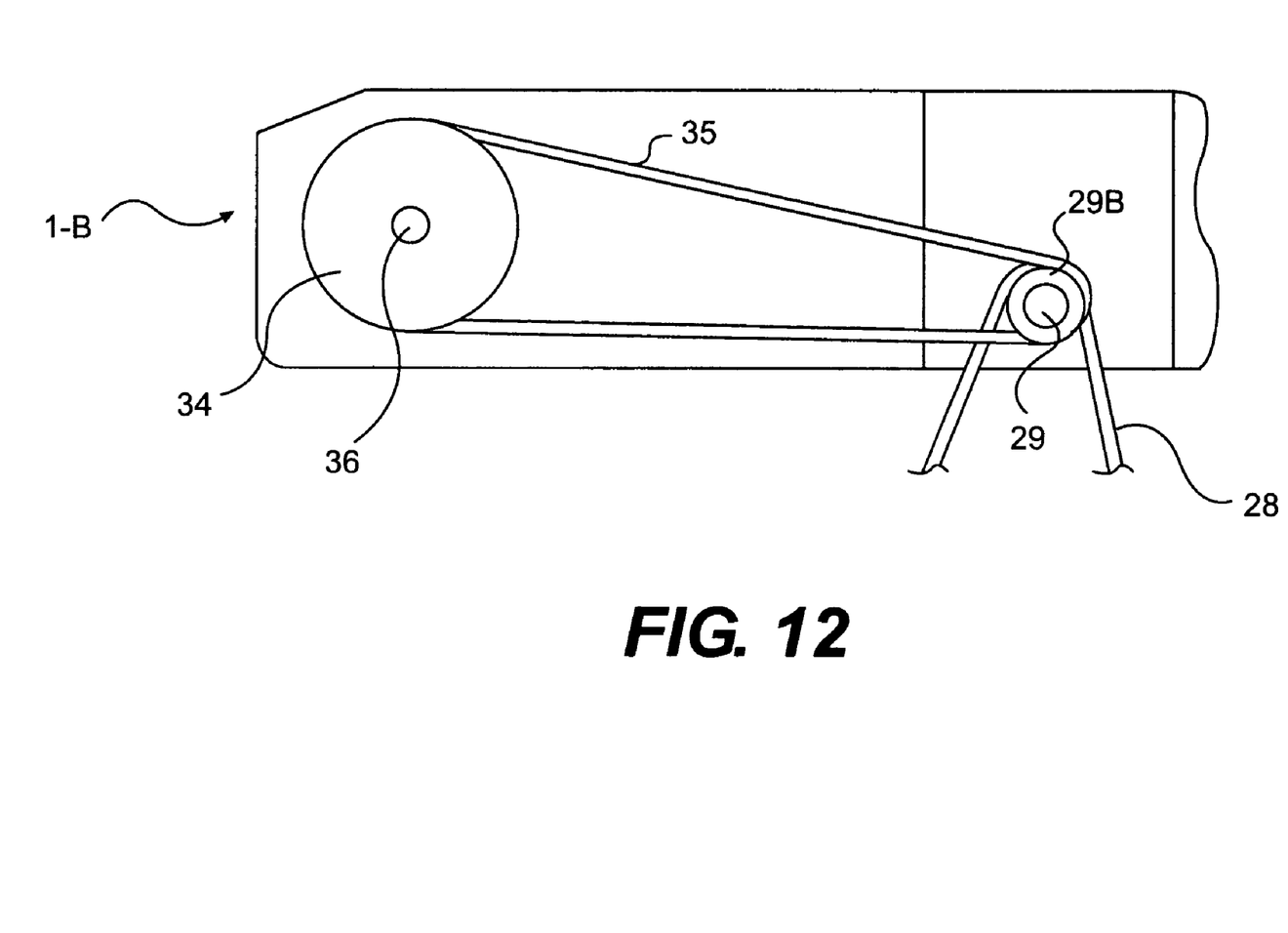
FIG. 12 is a side elevational profile of a motive power mechanism embodiment for vehicle 1-B.

Referring to FIGS. 10-12 are shown portions of alternate vehicle 1-B which varies from vehicle 1-A in that rather than pedal power, vehicle 1-B has a motor/battery/fuel cell or other motive power source. The pedals 20, of vehicle 1-A (see FIG. 1) may be deleted for alternative vehicle 1-B now described below, short posts may extend as foot rests from both sides of the forward tire axis of rotation or extensions may be added to the central frame as needed. The figures below focus on transferring power to one or both wheel assemblies.

Referring first to FIG. 10, is seen a cross-section of a pivoting wheel assembly, 2-A, a support cylinder or pivot, 31, the tire axle, 2-B, retained to the wheel assembly by a fixing member of any type, 32 as well as a wheel, 5, with drive belt track or lip 27. The power source indicated at x includes a suitable motor source "x" and "drive" 30 which translates motion to the wheel assembly female gear, 29. A belt, 28, resiliently interfits around the gear, 29, and around a wheel sprocket/lip 27, all shown in FIGS. 10 & 11. Accordingly the drive link 30 translates motion to the gear 29, then to the belt 28, turning at least one tire 5, providing rolling propulsion. When the wheel assembly is unlatched, it may pivot along the pivot, 31, and the drive linkage between female gear 29, and drive 30's male linkage tip 33 (FIG. 10) is accordingly detached. Moving the wheel assembly, 2-A to an operative latched position/orientation of FIG. 10 "automatically" engages the drive linkage described above.

FIG. 11 shows a detached pivoting wheel assembly, 2-A, the wheel axle, 2-B, wheel 5, wheel drive belt lip or sprocket, 27, wheel assembly wheel belt 28, as well as the tire axle 2-B, its cap, fixing member or nut 32 also.

FIG. 12 depicts another alternate embodiment of vehicle 1-B, where there is not a direct linkage from power source X and drive shaft 36 to the female gear 29 as shown in FIGS. 10 and 11, but instead an intermediate drive belt 35 interconnects from the drive source 36, ultimately to the gear 29. The power source X and its drive 36 and sprocket 34 are shown in FIG. 12 and may be of any suitable configuration/shape; however, the drive axle male tip 30 (see FIG. 10 where drive 30 meets female gear 29) is shaped and has a fixed position, and when the pivoting wheel assembly 2-A (not shown in FIG. 12) is pivoted into the latched and operative position, the female gear 29, is forced into linkage with a stub matching shaped male linkage gear 29-B (details of the matching male linkage tip are not full detailed in any Figure, but any keyed male shape may interconnect at this linkage). Any suitable belt or chain, 35, travels around the aforesaid stub male linkage gear, 29-B, which maintains a fixed position so that when the wheel assembly 2-A is pivoted/moved to the operative, latched position along the frame of the vehicle on its pivot, the propulsion linkage is engaged, translating motion from the power source X, through the belt system, to at least one tire, providing rolling propulsion.

Although the embodiments have been described as separate vehicles, it is understood that any combination of components may be mixed or matched between the embodiments, and various combinations of wheels/tires or components may be employed in variations other than those outlined.

What is claimed is:

1. A wheeled riding vehicle comprising:
At least three wheels for providing rolling support;
a steering column for providing steering control of at least one of the wheels;
a seat mounted to a central support frame;
a rear support frame including at least a four-sided frame comprising a side elevational profile, defining at least a partial lower base and at least a movable upper lid, forming an interior storage space;
at least two movable wheels connected with wheel-attaching means to two opposing frame sides, the wheels in a first operative position are orthogonal to the base, and in a second stowed position, each of the wheels are angularly moved to a position inside the interior storage space of the rear frame under the movable lid.

2. A wheeled riding vehicle according to claim 1 wherein propulsion is provided by pedals.

3. A wheeled riding vehicle according to claim 1 where a motor power source is the source of propulsion.

4. A wheeled riding vehicle according to claim 1 in which a battery provides the propulsion source.

5. A wheeled riding vehicle according to claim 1 in which a drive transfers motion between a motive power source and at least one of the wheels when the wheel is in the operative position.

6. A wheeled riding vehicle comprising:
at least three wheels for providing rolling support;
a steering column for providing steering control of at least one of the wheels;
a seat mounted to a central support frame, the support frame including at least a slotted portion;
a rear support frame including at least two wheels mounted thereto;
a selectively removable elongate handle including a grasp, mounted to the central frame, which in a first position is fully extended, which in a second position is at least partially retracted toward the frame, and in a third fully stowed position is removed from the mounting position of the first and second positions and in the third stowed position is housed at least partially within the central frame's slotted portion in a common plane with the central frame.

7. A wheeled riding vehicle according to claim 6 wherein propulsion is provided by pedals.

8. A wheeled riding vehicle according to claim 6 where a motor power source is the source of propulsion.

9. A wheeled riding vehicle according to claim 6 in which a battery provides the propulsion source.

10. A wheeled riding vehicle according to claim 6 in which a drive transfers motion between a motive power source and at least one of the wheels when the said wheel is in the operative position.

11. A wheeled riding vehicle comprising:

at least three wheels for providing rolling support;

a steering column for providing steering control of at least one of the wheels;

a seat mounted to a central support frame, the support frame including at least a slotted portion;

a rear support frame including at least two wheels mounted thereto;

a selectively removable elongate handle including a grasp, mounted to the central frame, which in a first position is fully extended, which in a second position is at least partially retracted toward the frame, and in a third fully stowed position is removed from the mounting position of the first and second positions and in the third stowed position is housed at least partially in a transverse orientation at least partly mounted to the rear support frame.

12. A wheeled riding vehicle according to claim 11 wherein propulsion is provided by pedals.

13. A wheeled riding vehicle according to claim 11 where a motor power source is the source of propulsion.

14. A wheeled riding vehicle according to claim 11 in which a battery provides the propulsion source.

15. A wheeled riding vehicle according to claim 11 in which a drive transfers motion between a motive power source and at least one of the wheels when the wheel is in the operative position.

* * * * *